(12) United States Patent
Lin et al.

(10) Patent No.: US 12,354,300 B2
(45) Date of Patent: Jul. 8, 2025

(54) INVERTING NEURAL RADIANCE FIELDS FOR POSE ESTIMATION

(71) Applicant: Google LLC, Mountain View, CA (US)

(72) Inventors: Tsung-Yi Lin, Sunnyvale, CA (US); Peter Raymond Florence, San Francisco, CA (US); Yen-Chen Lin, Cambridge, MA (US); Jonathan Tilton Barron, Alameda, CA (US)

(73) Assignee: GOOGLE LLC, Mountain View, CA (US)

( * ) Notice: Subject to any disclaimer, the term of this patent is extended or adjusted under 35 U.S.C. 154(b) by 381 days.

(21) Appl. No.: 18/011,601

(22) PCT Filed: Nov. 15, 2021

(86) PCT No.: PCT/US2021/059313
§ 371 (c)(1),
(2) Date: Dec. 20, 2022

(87) PCT Pub. No.: WO2022/104178
PCT Pub. Date: May 19, 2022

(65) Prior Publication Data
US 2023/0230275 A1    Jul. 20, 2023

Related U.S. Application Data

(60) Provisional application No. 63/114,399, filed on Nov. 16, 2020.

(51) Int. Cl.
*G06T 7/70*    (2017.01)

(52) U.S. Cl.
CPC ...... *G06T 7/70* (2017.01); *G06T 2207/20081* (2013.01); *G06T 2207/20084* (2013.01); *G06T 2207/30244* (2013.01)

(58) Field of Classification Search
CPC ............. G06T 7/70; G06T 2207/20081; G06T 2207/20084; G06T 2207/30244
See application file for complete search history.

(56) References Cited

U.S. PATENT DOCUMENTS

| | | | |
|---|---|---|---|
| 11,301,733 B2* | 4/2022 | Shlens | G06T 11/001 |
| 12,059,813 B2* | 8/2024 | Rohaninejad | G06N 3/045 |
| 2020/0311418 A1* | 10/2020 | Mahadeswaraswamy | H04N 9/3167 |
| 2021/0004693 A1* | 1/2021 | Joglekar | G06N 3/084 |
| 2022/0036602 A1* | 2/2022 | Duckworth | G06T 15/20 |

OTHER PUBLICATIONS

Chen et al, "Category Level Object Pose Estimation via Neural Analysis-by-Synthesis", arXiv:2008.08145v1, Aug. 18, 2020, 18 pages.

(Continued)

*Primary Examiner* — Bobbak Safaipour
(74) *Attorney, Agent, or Firm* — DORITY & MANNING, P.A.

(57) ABSTRACT

Provided are systems and methods that invert a trained NeRF model, which stores the structure of a scene or object, to estimate the 6D pose from an image taken with a novel view. 6D pose estimation has a wide range of applications, including visual localization and object pose estimation for robot manipulation.

20 Claims, 4 Drawing Sheets

(56) References Cited

OTHER PUBLICATIONS

Fan et al, "Deep Learning on Monocular Object Pose Detection and Tracking: A Comprehensive Overview", arXiv:2105.14291v1, May 29, 2021, 24 pages.
International Search Report for Application No. PCT/US2021/059313, mailed on Jan. 3, 2022, 2 pages.
Ma et al, "Deep Feedback Inverse Problem Solver", European Conference on Computer Vision, Aug. 23-28, 2020, Glasgow, United Kingdom, pp. 229-246.
Martin-Brualla et al, "NeRF in the Wild: Neural Radiance Fields for Unconstrained Photo Collections", arXiv:2008.02268v1, Aug. 5, 2020, 14 pages.
Mildenhall et al, "NeRF: Representing Scenes as Neural Radiance Fields for View Synthesis", arXiv:2003.08934v2, Aug. 3, 2020, 26 pages.
International Preliminary Report on Patentability for Application No. PCT/US2021/059313, mailed May 25, 2023, 8 pages.

* cited by examiner

INVERTING NEURAL RADIANCE FIELDS FOR POSE ESTIMATION

CROSS-REFERENCE TO RELATED APPLICATIONS

This application is based upon and claims the right of priority under 35 U.S.C. § 371 to International Application No. PCT/US2021/059313 filed on Nov. 15, 2021, which claims priority to U.S. Provisional Patent Application No. 63/114,399, filed Nov. 16, 2020. Each of the applications identified above is hereby incorporated by reference in its entirety.

FIELD

The present disclosure relates generally to systems and methods for pose estimation. More particularly, the present disclosure relates to inverting neural radiance fields for pose estimation.

BACKGROUND

Neural Radiance Field (NeRF) has demonstrated its strength in novel view image synthesis by capturing 3D geometry and appearance of scenes or objects with a neural network model. The differentiable neural model design allows it to use gradient descent to optimize the occupancy and color appearance in 3D space by training with a set of 2D images with known camera poses.

SUMMARY

Aspects and advantages of embodiments of the present disclosure will be set forth in part in the following description, or can be learned from the description, or can be learned through practice of the embodiments.

One example aspect of the present disclosure is directed to a computing system for determining camera pose. The computing system includes one or more processors and one or more non-transitory computer-readable media that collectively store: a machine-learned neural radiance field model that has been previously trained to model a scene; and instructions that, when executed by the one or more processors, cause the computing system to perform operations. The operations include obtaining a subject image that was captured by a camera. The operations include, for each of one or more pose update iterations: obtaining a current estimated pose for the camera; processing data descriptive of the current estimated pose with the machine-learned neural radiance field to generate one or more synthetic pixels of a synthetic image of the scene from the current estimated pose; evaluating a loss function that compares the one or more synthetic pixels with one or more observed pixels included in the subject image that was captured by the camera; and updating the current estimated pose for the camera based at least in part on a gradient of the loss function.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
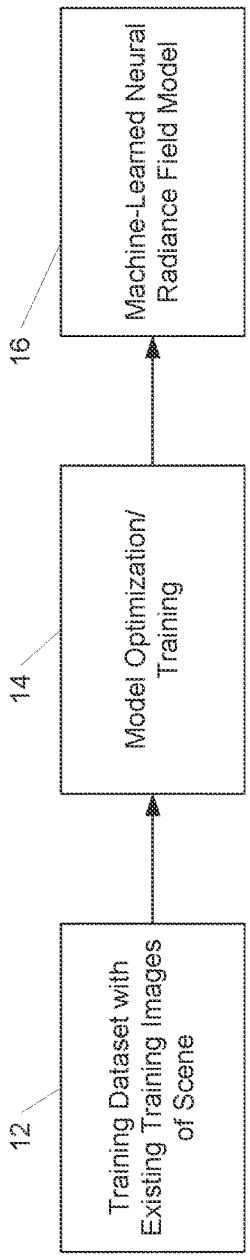
FIG. 1 depicts a block diagram of an example process for training a machine-learned neural radiance field model according to example embodiments of the present disclosure.

Reference numerals that are repeated across plural figures are intended to identify the same features in various implementations.

DETAILED DESCRIPTION

Overview

Generally, the present disclosure is directed to systems and methods that invert a trained neural radiance field (NeRF) model, which stores the structure of a scene or object, to estimate the pose (e.g., expressed in six dimensions (6D)) from an image taken with a novel view. Pose estimation has a wide range of applications, including visual localization and object pose estimation for robot manipulation/navigation.

Recently, the progress in novel view synthesis has sparked the interests in solving the challenges by the analysis-by-synthesis approach. However, obtaining a high quality 3D model of a scene usually requires special sensors which can typically be carried out only in a lab setting. NeRF offers a way to capture the 3D structure with a set of images and opens up the opportunity to apply the analysis-by-synthesis approach to real world scenarios.

Moreover, for object pose estimation, certain systems usually employ RGB-D camera(s) for accurate prediction. However, this introduces many problems including resolution, frame rate, field of view, and depth range. The present disclosure demonstrates that NeRF can perform accurate pose estimation with only RGB training and testing images.

In particular, the present disclosure provides a framework (example implementations of which can be referred to as "iNeRF") that performs pose estimation by "inverting" a trained Neural Radiance Field (NeRF). NeRFs have been shown to be remarkably effective for the task of view synthesis—synthesizing photorealistic novel views of real-world scenes or objects. This disclosure demonstrates that NeRFs can be used to accomplish the same improvement in quality for the task of 3D pose estimation—fitting a 3D model to an image of that model. As one example, given an initial pose estimate, example systems can use gradient descent to minimize the residual between pixels rendered from an already-trained NeRF and pixels in an observed image.

Example experiments contained in U.S. Provisional Patent Application No. 63/114,399 thoroughly study 1) how to sample rays during pose refinement for iNeRF to collect informative gradients and 2) how different loss functions affect iNeRF on the synthetic dataset presented by NeRF. iNeRF can perform visual localization in complex real-world scenes (e.g., as shown relative to the LLFF dataset). Furthermore, the proposed pose estimation pipeline, which can include a feature-based initialization and iNeRF refinement, outperforms all other RGB-based methods on LINEMOD when no real pose labels are provided.

The systems and methods of the present disclosure provide a number of technical effects and benefits. As one example, the present disclosure is able to perform pose estimation more efficiently than existing techniques. Specifically, many existing techniques require rendering an entire image at each candidate pose to determine which pose is optimal. Rendering and then analyzing the entirety of the image is computationally expensive. By contrast, example systems and methods described herein can selectively render only a small number of synthetic pixels—as opposed to the image as a whole. This results in significant computational savings, thereby conserving computing resources such as processor, memory, and/or network bandwidth.

As another example technical effect and benefit, the techniques described herein can be used to determine the pose of or localize an autonomous robot. By providing for improved pose estimation for the robot, the performance of the robot can be improved (e.g., more efficient and safer travel for an autonomous vehicle).

With reference now to the Figures, example embodiments of the present disclosure will be discussed in further detail.

Example NeRF Models

FIG. 1 depicts a block diagram of an example process for training a machine-learned neural radiance field model according to example embodiments of the present disclosure.

Referring to FIG. 1, a training dataset 12 can include existing training images that depict a scene. In some implementations, the training images may be unconstrained and may exhibit various inconsistencies with each other. As shown at 14, a computing system can perform a model optimization or training process on the training dataset 12 to generate a machine-learned neural radiance field model 16. After training, a position of a desired synthetic image can be provided to the model 16. In response, the model 16 can generate a synthetic image that depicts the scene from the position.

Example neural radiance field models and example techniques for training neural radiance field models are described in NeRF: Representing Scenes as Neural Radiance Fields for View Synthesis, Mildenhall et al., arXiv: 2003.08934 [cs.CV] and NeRF in the Wild: Neural Radiance Fields for Unconstrained Photo Collections, Martin-Brualla et al., arXiv:2008.02268 [cs.CV]. In some instances, the models and techniques described in these papers can be used as the model 16 and training 14.

In particular, given a collection of N RGB images $\{I_i\}_{i=1}^{N}$, $I_i \in [0,1]^{H \times W \times 3}$ with known camera poses $\{T_i\}_{i=1}^{N}$, NeRF can learn to synthesize novel views associated with unseen camera poses. NeRF does this by representing a scene as a "radiance field": a volumetric density that models the shape of the scene, and a view-dependent color that models the appearance of occupied regions of the scene, both of which lie within a bounded 3D volume. The density $\sigma$ and RGB color c of each point are parameterized by the weights $\Theta$ of a multilayer perceptron (MLP) F that takes as input the 3D position of that point x=(x, y, z) and the unit-norm viewing direction of that point d=($d_x$, $d_y$, $d_z$), where $(\sigma, c) \leftarrow F_\Theta(x, d)$.

To render a pixel, NeRF can emit a camera ray from the center of the projection of a camera through that pixel on the image plane. Along the ray, a set of points can be sampled for use as input to the MLP which outputs a set of densities and colors. These values can then be used to approximate the image formation behind volume rendering using numerical quadrature, producing an estimate of the color of that pixel. NeRF can be trained to minimize a photometric loss $\mathcal{L} = \sum_{r \in \mathcal{R}} \|\hat{C}(r) - C(r)\|_2^2$, using some sampled set of rays $r \in \mathcal{R}$ where C(r) is the observed RGB value of the pixel corresponding to ray r in some image, and $\hat{C}(r)$ is the prediction produced from neural volume rendering. To improve rendering efficiency one may train two MLPs: one "coarse" and one "fine", where the coarse model serves to bias the samples that are used for the fine model.

Example Inversion of NeRF Models

Example Formulation

The present disclosure provides a framework (example implementations of which can be referred to as iNeRF) that performs pose estimation (e.g., with 6 DoF) by "inverting" a trained NeRF. Assume that the NeRF of a scene or object parameterized by $\Theta$ has already been recovered and that the camera intrinsics are known, but the camera pose T of an image observation I are as-yet undetermined. Unlike NeRF, which optimizes $\Theta$ using a set of given camera poses and image observations, example implementations can instead solve the inverse problem of recovering the camera pose T given the weights $\Theta$ and the image I as input:

$$\hat{T} = \underset{T \in SE(3)}{\mathrm{argmin}}\ \mathcal{L}(T \mid I, \Theta) \qquad (1)$$

Figure 2:
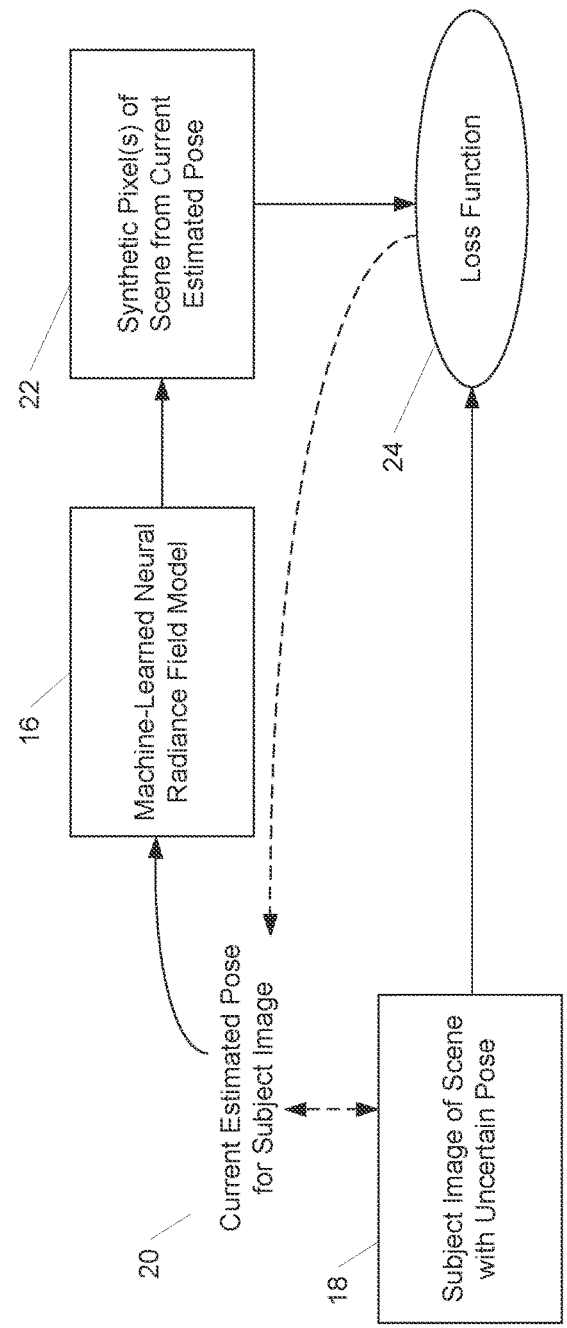
FIG. 2 depicts a block diagram of an example process to estimate camera pose using a machine-learned neural radiance field model according to example embodiments of the present disclosure.

To solve this optimization, example implementations use the ability from NeRF to take some estimated camera pose $T \in SE(3)$ in the coordinate frame of the NeRF model and render a corresponding image observation. Example implementations can then use the same photometric loss function $\mathcal{L}$ as was used in NeRF (see description above), but rather than backpropagate to update the weights $\Theta$ of the MLP, a computing system can instead update the pose T to minimize $\mathcal{L}$. The overall procedure is shown in FIG. 2, which is discussed in more detail below.

While the concept of inverting a NeRF to perform pose estimation can be concisely stated, it is not apparent at the outset that such a problem can be practically solved to a useful degree. The loss function $\mathcal{L}$ is non-convex over the 6DoF space of SE(3), and full-image NeRF renderings are computationally expensive, particularly if used in the loop of an optimization procedure. The example formulations and experimentations described herein aim to address these challenges. The next sections discuss (i) the gradient-based SE(3) optimization procedure, (ii) ray sampling strategies, and (iii) how to use iNeRF's predicted poses to improve NeRF.

Gradient-Based SE(3) Optimization

Let $\Theta$ be the parameters of a trained and fixed NeRF, $\hat{T}_i$ the estimated camera pose at current optimization step i, I the observed image, and $\mathcal{L}(\hat{T}_i|I, \Theta)$ be the loss used to train the fine model in NeRF. Example implementations can employ gradient-based optimization to solve for $\hat{T}$ as defined in Equation 1. To ensure that the estimated pose $\hat{T}_i$ continues to lie on the SE(3) manifold during gradient-based optimization, example implementations can parameterize $\hat{T}_i$ with exponential coordinates. Given an initial pose estimate $\hat{T}_0 \in$ SE(3) from the camera frame to the model frame, example implementations can represent $\hat{T}_i$ as:

$$\hat{T}_i = e^{[\mathcal{S}_i]\theta_i}\hat{T}_0,$$

where $$e^{[\mathcal{S}]\theta} = \begin{bmatrix} e^{[\omega]\theta} & K(\mathcal{S}, \theta) \\ 0 & 1 \end{bmatrix},$$

where $\mathcal{S}=[\omega, v]^T$ represents the screw axis, $\theta$ the magnitude, $[w]$ represents the skew-symmetric 3×3 matrix of w, and $K(\mathcal{S}, \theta) = (I\theta + (1-\cos\theta)[\omega] + (\theta - \sin\theta)[\omega]^2)v$ [14]. With this parameterization, our goal is to solve the optimal relative transformation from an initial estimated pose $T_0$:

$$\widehat{\mathcal{S}\theta} = \underset{\mathcal{S}\theta \in \mathbb{R}^6}{\mathrm{argmin}}\ \mathcal{L}(e^{[\mathcal{S}]\theta}T_0\,|\,I, \Theta). \quad (2)$$

Example implementations can iteratively differentiate the loss function through the MLP to obtain the gradient $\nabla_{\mathcal{S}\theta}\mathcal{L}$ $e^{[\mathcal{S}]\theta}T_0|I, \Theta)$ that is used to update the estimated relative transformation. Example implementations can use Adam optimizer with an exponentially decaying learning rate.

For each observed image, example implementations can initialize $\mathcal{S}\theta$ near 0, where each element is drawn at random from a zero-mean normal distribution $\mathcal{N}(0, \sigma=10^{-6})$. In practice, parameterizing with $e^{[\mathcal{S}]\theta}T_0$ rather than $T_0$ $e^{[\mathcal{S}]\theta}$ results in a center-of-rotation at the initial estimate's center, rather than at the camera frame's center. This alleviates coupling between rotations and translations during optimization.

Example Techniques for Sampling Rays

In a typical differentiable render-and-compare pipeline, one would want to leverage the gradients contributed by all of the output pixels in the rendered image. However, with NeRF, each output pixel's value is computed by weighing the values of n sampled points along each ray $r \in \mathcal{R}$ during ray marching, so given the amount of sampled rays in a batch $b=|\mathcal{R}|$, $\mathcal{O}(bn)$ forward/backward passes of the underlying NeRF MLP will be queried. Computing and backpropagating the loss of all pixels in an image (i.e., b=HW, where H and W represent the height and width of a high-resolution image) therefore require significantly more memory than is present on any commercial GPU.

While some example implementations of the present disclosure may perform multiple forward and backward passes to accumulate these gradients, this becomes prohibitively slow to perform each step of the already-iterative optimization procedure. In the following, strategies are provided for selecting a sampled set of rays $\mathcal{R}$ for use in evaluating the loss function $\mathcal{L}$ at each optimization step.

Example experiments indicate that example implementations are able to recover accurate poses while sampling only b=2048 rays per gradient step, which corresponds to a single forward/backward pass that fits within GPU memory and provides 150× faster gradient steps on a 640×480 image.

Random Sampling

An intuitive strategy is to sample M pixel locations $\{p_x^i, p_y^i\}_{i=0}^M$ on the image plane randomly and compute their corresponding rays. Indeed, NeRF itself uses this strategy when optimizing $\Theta$ (assuming image batching is not used). However, this random sampling strategy's performance can be ineffective when the batch size of rays b is small. For certain types of scenes, most randomly-sampled pixels correspond to flat, textureless regions of the image, which provide little information with regards to pose (which is consistent with the well-known aperture problem).

Interest Point Sampling

Another sampling approach is interest point sampling. In interest point sampling, a computing system first employs interest point detectors to localize a set of candidate pixel locations in the observed image. The computing system can then sample M points from the detected interest points and fall back to random sampling if not enough interest points are detected. Although this strategy makes optimization converge faster since less stochasticity is introduced, it can be prone to local minima as it only considers interest points on the observed image instead of interest points from both the observed and rendered images. However, obtaining the interest points in the rendered image requires $\mathcal{O}(HWn)$ forward MLP passes and thus can be expensive to use in the optimization.

Interest Region Sampling

To prevent the local minima caused by only sampling from interest points, some example implementations of the present disclosure can perform "Interest Region" Sampling, a strategy that relaxes Interest Point Sampling and samples from the local regions (e.g., dilated masks) centered on or otherwise adjacent to the interest points. As one example, after the interest point detector localizes the interest points, a computing system can apply a 5×5 morphological dilation for I iterations to enlarge the sampled region. In practice, region-based sampling can speed up the optimization when the batch size of rays is small. Note that if I is set to an overly large number, Interest Region Sampling falls back to Random Sampling.

Example Visualization of Data Flow

FIG. 2 depicts a block diagram of an example process to estimate camera pose using the machine-learned neural radiance field model 16 according to example embodiments of the present disclosure.

More specifically, after or during training 14, the model 16 can be used to estimate a pose of a camera that captured a subject image 18. The process can be performed iteratively to determine the camera pose. As one example, the current estimated pose is expressed as exponential coordinates for six degrees of freedom.

As shown in FIG. 2, at each of one or more update iterations, a computing system can obtain a current estimated pose 20 for the camera that captured the subject image 18. The computing system can process the data descriptive of the current estimated pose 20 with the machine-learned neural radiance field 16 to generate one or more synthetic pixels 22 of a synthetic image of the scene from the current estimated pose 20.

As one example, processing the data descriptive of the current estimated pose 20 with the machine-learned neural radiance field 16 to generate the one or more synthetic pixels 22 can include: determining a subsampled image plane that identifies one or more sampled pixels from a plurality of possible pixels; determining a ray and a direction for each of the one or more sampled pixels; and processing data descriptive of the ray and the direction to generate one of the synthetic pixels for each of the sampled pixels.

As one example, processing the data descriptive of the current estimated pose 20 with the machine-learned neural radiance field 16 to generate the one or more synthetic pixels 22 can include: identifying one or more interest points; identifying an interest region around each of the one or more interest points; sampling point(s) from the interest region(s); generating synthetic pixel(s) for the sampled point(s).

Having generated the synthetic pixels 22, the computing system can evaluate a loss function 24 that compares the one or more synthetic pixels 22 with one or more observed pixels included in the subject image 18 that was captured by the camera.

As one example, the loss function can compare a respective intensity of the one or more synthetic pixels with a respective intensity of the one or more observed pixels included in the subject image that was captured by the camera.

As another example, wherein the loss function can additionally or alternatively compare a respective chrominance of the one or more synthetic pixels with a respective chrominance of the one or more observed pixels included in the subject image that was captured by the camera.

As further examples, the loss function can be an L1 loss function, an L2 loss function, and/or a Huber loss function.

The computing system can update the current estimated pose 20 for the camera based at least in part on a gradient of the loss function 24. For example, the loss function 24 can be backpropagated through the model 16 to update the estimated pose 20.

After the one or more iterations are completed, the current estimated pose 20 can be output as the final estimated pose for the subject image 18.

In some implementations, the camera is associated with an autonomous robot (e.g., an autonomous vehicle) that navigates the scene based on the estimated pose for the camera.

In some implementations, the subject image 18 depicts the same scene as the training dataset 12. In other implementations, the subject image 18 depicts a different, but similar scene as the training dataset 12.

Self-Supervising NeRF with iNeRF

In addition to using iNeRF to perform pose estimation given a trained NeRF, the present disclosure also provides techniques for using the estimated poses to feed back into training the NeRF representation. Specifically, some example implementations can first (1) train a NeRF given a set of training RGB images with known camera poses $\{(I_i, T_i)\}_{i=1}^{N_{train}}$, yielding NeRF parameters $\Theta_{train}$. The example implementations can then (2) use iNeRF to take in additional unknown-pose observed images $\{I_i\}_{i=1}^{N_{test}}$ and solve for estimated poses $\{\hat{T}_i\}_{i=1}^{N_{test}}$. Given these estimated poses, the example implementations can then (3) use the self-supervised pose labels to add $\{(I_i, \hat{T}_i)\}_{i=1}^{N_{test}}$ into the training set. This procedure allows NeRF to be trained in a semi-supervised setting.

Example Devices and Systems

Figure 3A:
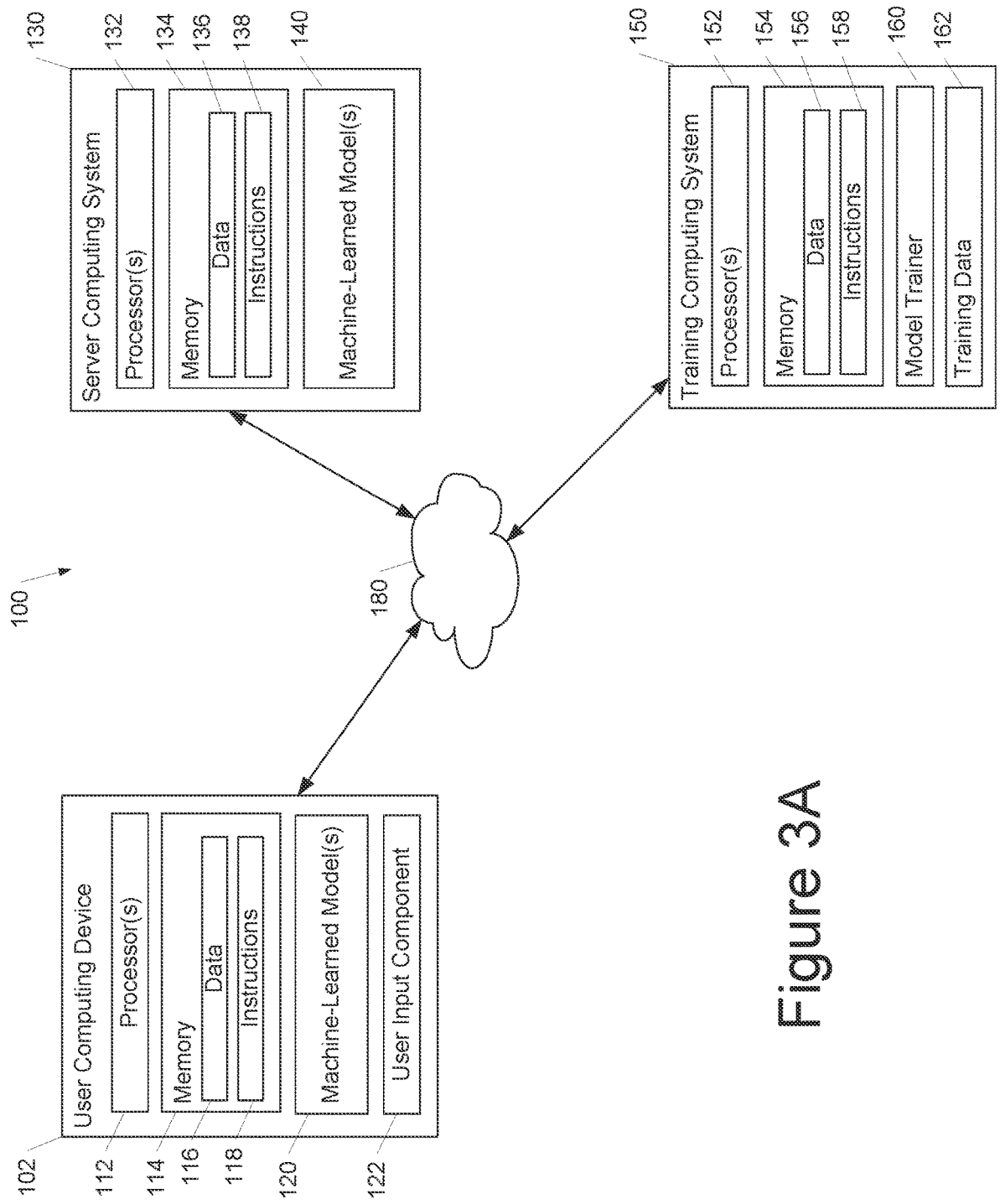
FIG. 3A depicts a block diagram of an example computing system according to example embodiments of the present disclosure.

FIG. 3A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIGS. 1-2.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel view synthesis across multiple instances of the same or different scenes).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a view synthesis service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 1-2.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, unconstrained image data such as "in the wild" photographs.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 3A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 3B:
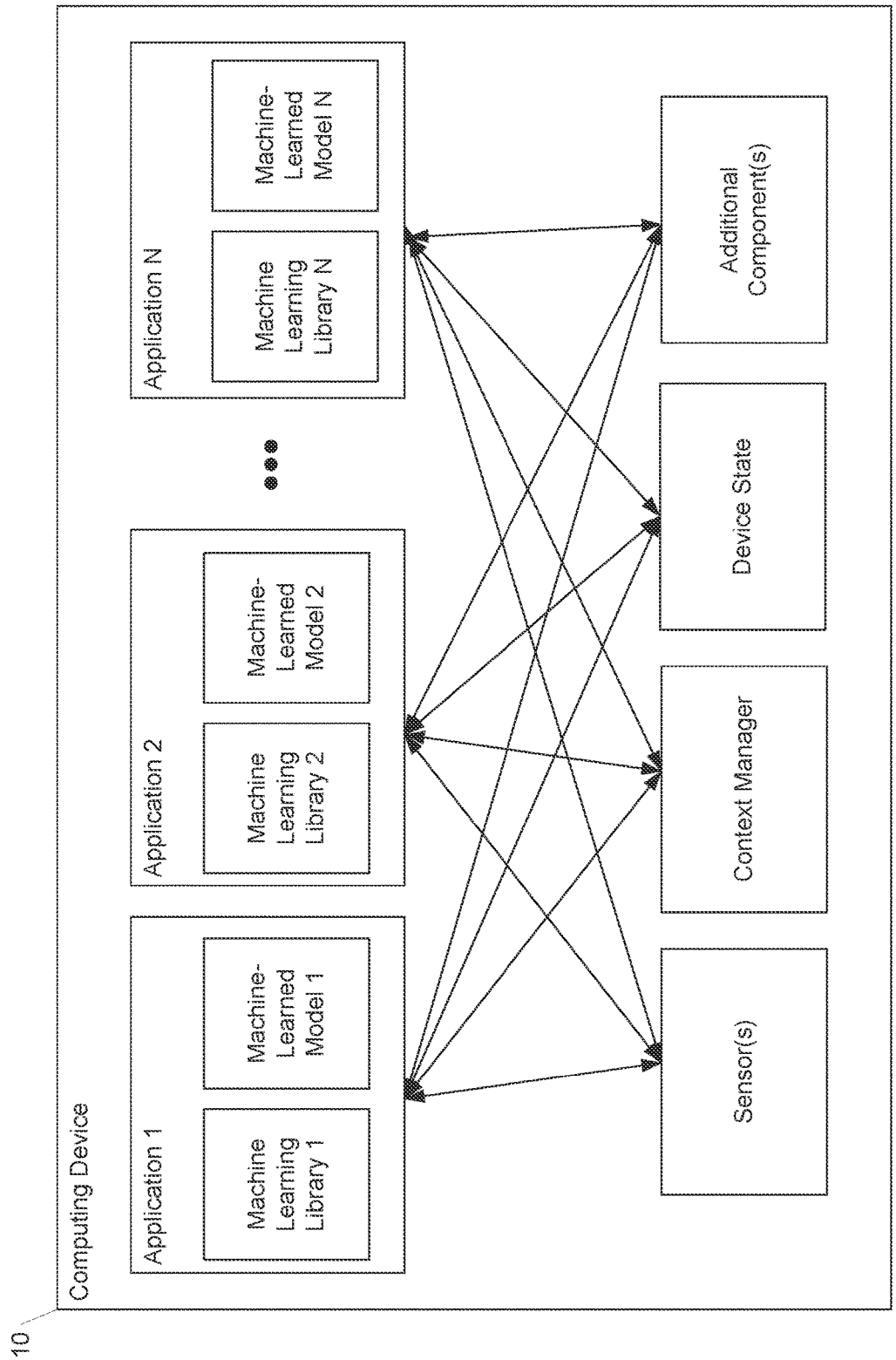
FIG. 3B depicts a block diagram of an example computing device according to example embodiments of the present disclosure.

FIG. 3B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 3B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 3C:
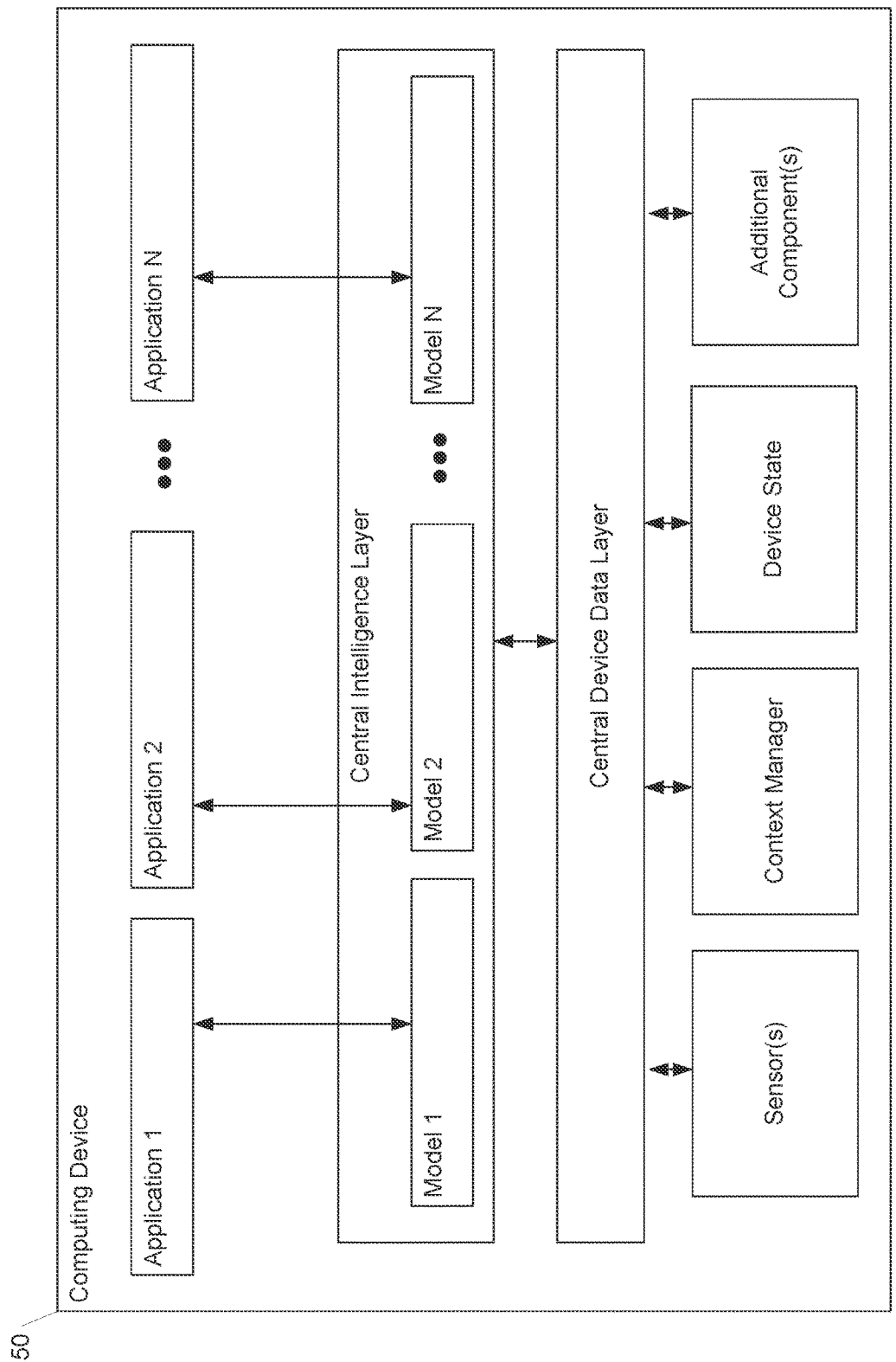
FIG. 3C depicts a block diagram of an example computing device according to example embodiments of the present disclosure.

FIG. 3C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 3C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 3C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for determining camera pose, the computing system comprising:
one or more processors; and
one or more non-transitory computer-readable media that collectively store:
a machine-learned neural radiance field model that has been previously trained to model a scene; and
instructions that, when executed by the one or more processors, cause the computing system to perform operations, the operations comprising:
obtaining a subject image that was captured by a camera; and
for each of one or more pose update iterations:
obtaining a current estimated pose for the camera;
processing data descriptive of the current estimated pose with the machine-learned neural radiance field to generate one or more synthetic pixels of a synthetic image of the scene from the current estimated pose;
evaluating a loss function that compares the one or more synthetic pixels with one or more observed pixels included in the subject image that was captured by the camera; and
updating the current estimated pose for the camera based at least in part on a gradient of the loss function.

2. The computing system of claim 1, wherein the current estimated pose is expressed as exponential coordinates for six degrees of freedom.

3. The computing system of claim 1, wherein the loss function compares a respective intensity of the one or more synthetic pixels with a respective intensity of the one or more observed pixels included in the subject image that was captured by the camera.

4. The computing system of claim 1, wherein the loss function compares a respective chrominance of the one or more synthetic pixels with a respective chrominance of the one or more observed pixels included in the subject image that was captured by the camera.

5. The computing system of claim 1, wherein the loss function comprises a Huber loss function.

6. The computing system of claim 1, wherein the loss function comprises an L1 or L2 loss function.

7. The computing system of claim 1, wherein the camera is associated with an autonomous robot that navigates the scene based on the estimated pose for the camera.

8. The computing system of claim 1, wherein processing the data descriptive of the current estimated pose with the machine-learned neural radiance field to generate the one or more synthetic pixels comprises:
determining a subsampled image plane that identifies one or more sampled pixels from a plurality of possible pixels;
determining a ray and a direction for each of the one or more sampled pixels; and
processing data descriptive of the ray and the direction to generate one of the synthetic pixels for each of the sampled pixels.

9. The computing system of claim 1, wherein the subject image depicts the scene.

10. The computing system of claim 1, wherein the subject image depicts a different but similar scene.

11. A computer-implemented method for determining camera pose, the method comprising:
obtaining, by a computing system comprising one or more computing devices, a subject image that was captured by a camera;

accessing, by the computing system, a machine-learned neural radiance field model that has been previously trained to model a scene; and for each of one or more pose update iterations:

obtaining, by the computing system, a current estimated pose for the camera;

processing, by the computing system, data descriptive of the current estimated pose with the machine-learned neural radiance field to generate one or more synthetic pixels of a synthetic image of the scene from the current estimated pose;

evaluating, by the computing system, a loss function that compares the one or more synthetic pixels with one or more observed pixels included in the subject image that was captured by the camera; and updating, by the computing system, the current estimated pose for the camera based at least in part on a gradient of the loss function.

12. The computer-implemented method of claim 11, wherein the current estimated pose is expressed as exponential coordinates for six degrees of freedom.

13. The computer-implemented method of claim 11, wherein the loss function compares a respective intensity of the one or more synthetic pixels with a respective intensity of the one or more observed pixels included in the subject image that was captured by the camera.

14. The computer-implemented method of claim 11, wherein the loss function compares a respective chrominance of the one or more synthetic pixels with a respective chrominance of the one or more observed pixels included in the subject image that was captured by the camera.

15. The computer-implemented method of claim 11, wherein the loss function comprises a Huber loss function.

16. The computer-implemented method of claim 11, wherein the loss function comprises an L1 or L2 loss function.

17. The computer-implemented method of claim 11, wherein the camera is associated with an autonomous robot that navigates the scene based on the estimated pose for the camera.

18. The computer-implemented method of claim 11, wherein processing the data descriptive of the current estimated pose with the machine-learned neural radiance field to generate the one or more synthetic pixels comprises:

determining a subsampled image plane that identifies one or more sampled pixels from a plurality of possible pixels;

determining a ray and a direction for each of the one or more sampled pixels; and processing data descriptive of the ray and the direction to generate one of the synthetic pixels for each of the sampled pixels.

19. The computer-implemented method of claim 11, wherein the subject image depicts the scene.

20. One or more non-transitory computer-readable media that collectively store instructions that, when executed, cause a computing system to perform operations, the operations comprising:

obtaining, by the computing system, a subject image that was captured by a camera;

accessing, by the computing system, a machine-learned neural radiance field model that has been previously trained to model a scene; and for each of one or more pose update iterations:

obtaining, by the computing system, a current estimated pose for the camera;

processing, by the computing system, data descriptive of the current estimated pose with the machine-learned neural radiance field to generate one or more synthetic pixels of a synthetic image of the scene from the current estimated pose;

evaluating, by the computing system, a loss function that compares the one or more synthetic pixels with one or more observed pixels included in the subject image that was captured by the camera; and updating, by the computing system, the current estimated pose for the camera based at least in part on a gradient of the loss function.

* * * * *